(12) United States Patent
Takagi et al.

(10) Patent No.: US 7,455,926 B2
(45) Date of Patent: Nov. 25, 2008

(54) AIRBREATHING FUEL CELL

(75) Inventors: Takehisa Takagi, Inuyama (JP); Yukio Naruse, Inuyama (JP); Eiji Kato, Inuyama (JP); Shoji Nawa, Inuyama (JP); Yasuo Ido, Inuyama (JP)

(73) Assignee: Daido Metal Company Ltd., Naka-Ku (JP)

( * ) Notice: Subject to any disclaimer, the term of this patent is extended or adjusted under 35 U.S.C. 154(b) by 574 days.

(21) Appl. No.: 10/649,869

(22) Filed: Aug. 28, 2003

(65) Prior Publication Data

US 2004/0043281 A1 Mar. 4, 2004

(30) Foreign Application Priority Data

Aug. 29, 2002 (JP) .............................. 2002-249915

(51) Int. Cl.
*H01M 2/14* (2006.01)
(52) U.S. Cl. .............................. 429/38; 429/39; 429/34; 429/32; 429/38
(58) Field of Classification Search .................... 429/37, 429/34, 38, 31, 32, 39
See application file for complete search history.

(56) References Cited

U.S. PATENT DOCUMENTS 5,595,834 A 1/1997 Wilson et al.
6,423,437 B1 * 7/2002 Kenyon et al. ................ 429/32
6,497,971 B1 * 12/2002 Reiser .......................... 429/13
2003/0219635 A1 * 11/2003 Lee et al. ...................... 429/13

FOREIGN PATENT DOCUMENTS

JP 2002-270212 9/2002

\* cited by examiner

*Primary Examiner*—Patrick Ryan
*Assistant Examiner*—Ben Lewis March
(74) *Attorney, Agent, or Firm*—Browdy and Neimark, P.L.L.C.

(57) ABSTRACT

An airbreathing fuel cell, in which oxygen can be adequately supply to oxygen passage plates to obtain a power generating capacity conformed to a demand, comprises a cell stack formed in the form of a rectangle by stacking a plurality of those unit cells, which comprise a solid polymer electrolyte membrane, an oxygen electrode and a fuel electrode, which are provided on both sides of the solid polymer electrolyte membrane to be opposed to each other, an oxygen passage plate provided adjacent and toward the oxygen electrode, and separator plates provided adjacent and outside the oxygen passage plate and the fuel electrode, and the oxygen passage plate comprises a plurality of opened grooves on a surface thereof opposed to the oxygen electrode, the grooves being opened outside at both ends thereof.

9 Claims, 6 Drawing Sheets

000# AIRBREATHING FUEL CELL

BACKGROUND OF THE INVENTION

1. Technical Field

The present invention relates to a fuel cell usable for various usages such as electric sources and electric generators for outdoor, pleasure trip, household, business machines, or the like, and more particular, to an airbreathing fuel cell capable of supplying a sufficient amount of oxygen into cells in a pollution-free polymer electrolyte fuel cell.

2. Background Art

Among fuel cells, a polymer electrolyte fuel cell with hydrogen as a main fuel has been given attention and developed because of low working temperature and high power density. Examples of such fuel cells are described in U.S. Pat. No. 5,595,834 or JP-A 2002-270212 filed by the applicant of the present application.

Figure 9:
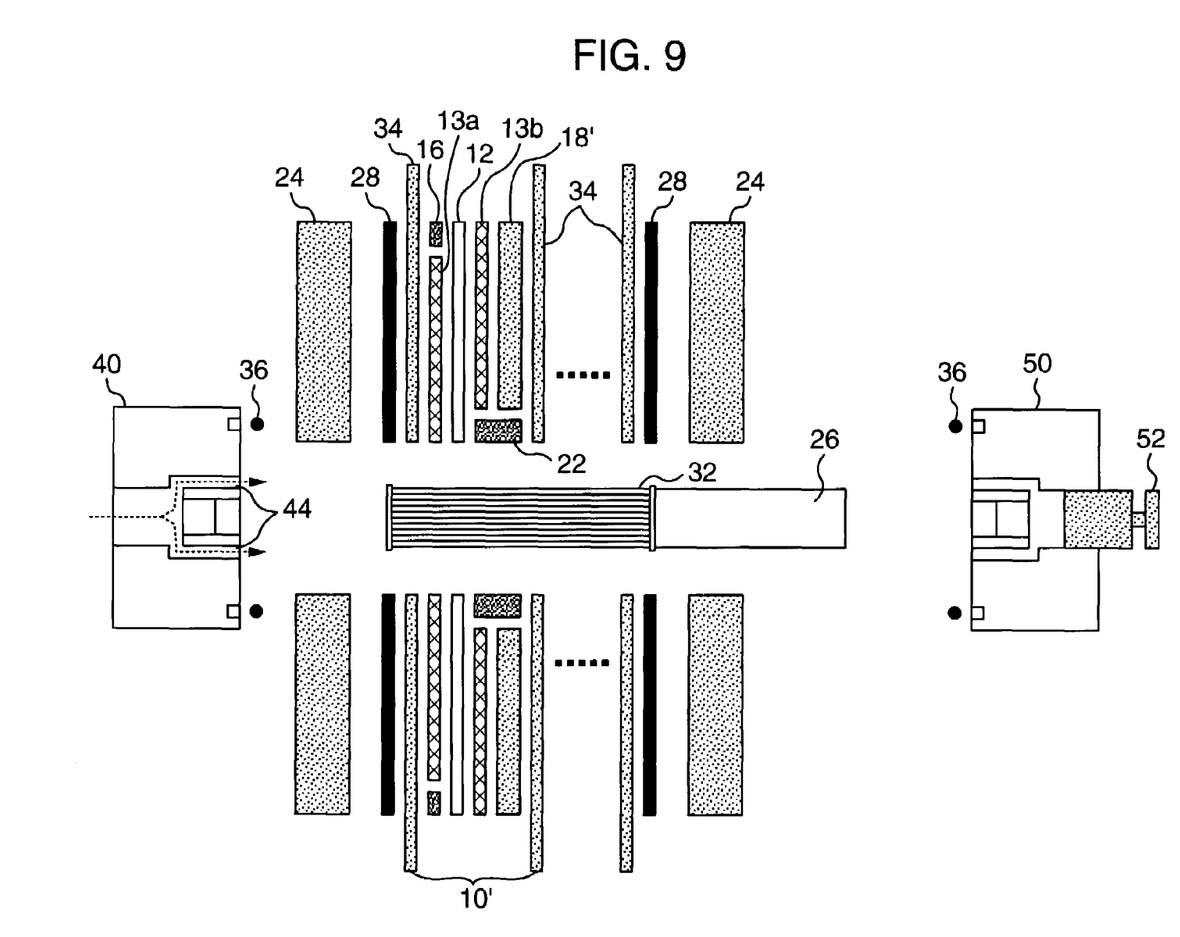
FIG. 9 is an exploded, cross sectional view showing an airbreathing fuel cell according to the prior art.

As an example of such fuel cells, the inventors of the present application have proposed an airbreathing fuel cell, in which unit cells having a circular-shaped cross section are stacked. Concretely, a unit cell 10' comprises, as shown in FIG. 9, an anode (fuel electrode) 13a and a cathode (oxygen electrode) 13b provided on both surfaces of a solid polymer electrolyte membrane 12, an oxygen passage plate 18' provided adjacent and toward the oxygen electrode, and separator plates 34 arranged outside the fuel electrode 13a and outside the oxygen passage plate 18' to unite these elements, and a plurality of such unit cells 10' are stacked together so as to provide a cell stack as hereinafter referred to "a cell stack". In addition, the separator plates 34 are provided with terminals, through which electricity generated is taken out, and serve as collecting plates. Further, a fuel distribution manifold 32 communicated to the fuel electrodes 13a and composed of a sleeve of hydrophilic synthetic fiber yarns is provided to extend through central holes of the unit cells 10, end plates 24 are further provided on both ends of a tie bolt 26, which extends centrally through the fuel distribution manifold 32, to interpose end gaskets 28 between the end plates 24 and the separator plates 34, and one nut 40 having fuel flow passages 44 and the other nut 50 having a breeder valve 52 interpose O-rings 36 between them and the end plates 24 to clamp and fix the unit cells integrally. Since such fuel cell can be made small in size and lightweight, it has been developed as a fuel cell of low power.

Also, such polymer electrolyte fuel cell is configured such that a fuel is fed from a center of the one nut 40 through the fuel flow passages 44 as shown with dash lines in FIG. 9 to be distributed to the fuel electrodes 13a through the hydrophilic synthetic fiber yarns sleeve of the fuel distribution manifold 32.

However, with such conventional solid polymer electrolyte fuel cell, oxygen is supplied to the oxygen electrodes 13b by supplying of a surrounding air through the porous oxygen passage plates 18, and in the case of a fuel cell of small electric power, supplying of an air for attaining the function of the cell is effected through holes of oxygen passage plates. However, an amount of oxygen supplied through such oxygen passage plates places a limit upon the power generating capacity, and therefore power generation cannot be performed to obtain an electric current according to uses.

Also, such airbreathing fuel cell is generally cylindrical-shape so that oxygen from the surrounding atmosphere is uniformly supplied to the oxygen electrodes through the oxygen passage plates, and thus the oxygen passage plates are made small in area to make a large resistance to passage of an air through the porous oxygen passage plates, so that oxygen cannot be supplied sufficiently to increase electric power generation.

SUMMARY OF THE INVENTION

The invention has been thought of in view of the problem, and has its object to provide an airbreathing fuel cell, of which power generating capacity is enhanced by adequately supplying oxygen to oxygen electrodes from oxygen passage plates.

Also, another object of the invention is to provide an airbreathing fuel cell, in which air blasting for supplying of oxygen is forcibly performed to be able to obtain a power generating capacity at need.

To attain the above objects, the airbreathing fuel cell according to an embodiment of the invention comprises a cell stack formed by stacking a plurality of those unit cells, which comprise a solid polymer electrolyte membrane, an oxygen electrode and a fuel electrode, which are provided on both sides of the solid polymer electrolyte membrane to be opposed to each other, an oxygen passage plate provided adjacent and toward the oxygen electrode, and separator plates provided adjacent and outside the oxygen passage plate and the fuel electrode, the oxygen passage plate comprising a plurality of opened grooves on a surface thereof opposed to the oxygen electrode, and the grooves being opened outside at both ends thereof.

With the airbreathing fuel cell, since the plurality of opened grooves are provided on a side surface of the oxygen passage plate opposed to the oxygen electrode to be opened at both ends thereof to an outer periphery of the plate, an air can flow directly toward a center of the oxygen passage plate in the grooves and the air having flown directly to the center causes oxygen to be supplied to the oxygen electrode through the oxygen passage plate, so that oxygen is supplied to the oxygen electrode via a short path to be able to react in the solid polymer electrolyte membrane with a fuel sufficiently supplied to the cell center, thus enabling improving the power generating capacity.

Another embodiment of the invention adds to the airbreathing fuel cell a feature that blowers for blasting an air into the grooves formed on the oxygen passage plates are provided on the fuel cell.

Even when such grooves formed on the oxygen passage plates are set to be formed shallow and small in cross section, an air can be caused by the blowers to flow forcibly into the grooves toward the ends of the grooves. Thereby, it is possible to supply oxygen into the central portion of cell stack.

And a further embodiment of the invention adds to the airbreathing fuel cell a feature that the blowers are arranged in opposition to the both opened ends of the grooves on the oxygen passage plates of the cell stack to blast an air whereby an air can be supplied centrally of the oxygen passage plates from the both ends of the grooves.

According to the further embodiment of the invention, the blowers are arranged in opposition to the both ends of the oxygen passage plates whereby an air forcibly fed into the grooves from the both ends stays near the centers of the oxygen passage plates to be compressed, thus an air having a high density is given to be able to positively achieve entry of oxygen into the oxygen passage plates, oxygen having a high density can be fed to the oxygen electrodes through the oxygen passage plates, and the power generating capacity can be improved by supplying oxygen having a high density to a fuel fed from the centers to expedite a power generating reaction.

Also, a still further embodiment of the invention has a feature that the blowers for the cell stack are provided at least one by one on sides of the both opened ends of the grooves of the oxygen passage plates and on respective sides in parallel to the grooves, and the blowers provided on the opposed sides are provided in opposition to each other respectively to blast an air to the oxygen passage plates.

According to the still further embodiment of the invention, since the blowers are not only provided on sides of the both opened ends of the grooves provided on the oxygen passage plates but also provided on other opposed sides perpendicular to the sides, an air for supplying of oxygen to the oxygen passage plates is forcibly supplied to the oxygen passage plates, not only an air is supplied to the oxygen passage plates through the grooves but also oxygen is supplied directly to the oxygen passage plates, and an air flows on surfaces of the cell stack, whereby moisture generated in the fuel cell itself can be evaporated to expedite a power generating reaction between a fuel and oxygen, thus enabling contributing to an improvement in power generating capacity.

Further, an outer peripheral surface of the cell stack is formed to be rectangular in shape whereby it is easy to install the blowers. Also, since the oxygen passage plates are also formed to be rectangular in shape and oxygen taking-in ports can be made large in cross sectional area, the reaction of oxygen with a fuel supplied can be adequately developed.

DESCRIPTION OF THE PREFERRED EMBODIMENTS

Embodiments of the invention will be described below in detail with reference to the drawings.

Figure 1:
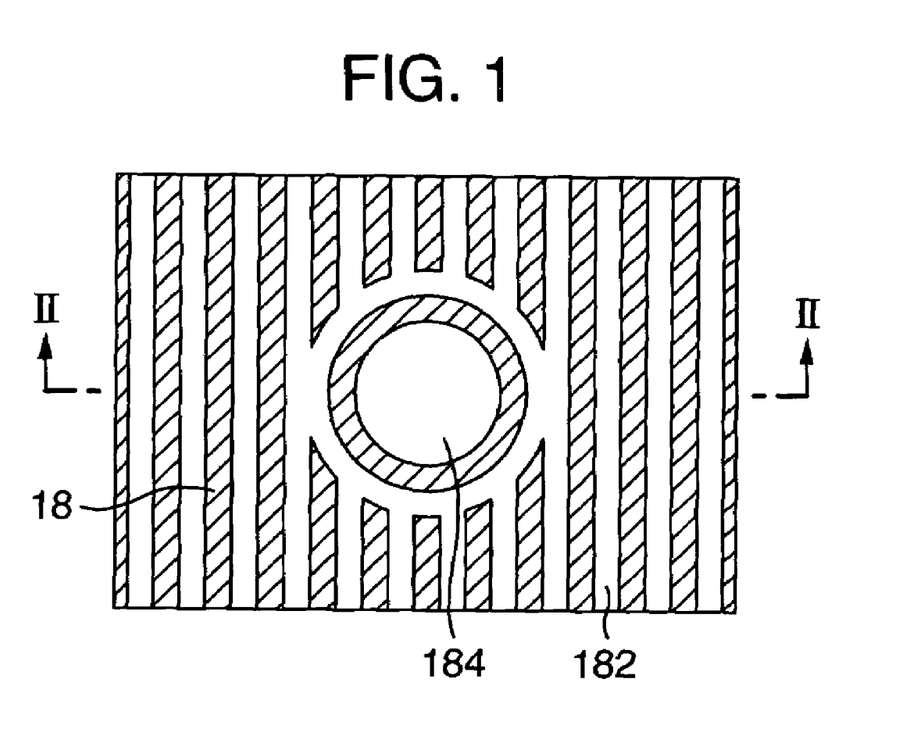
FIG. 1 is a plan view showing an oxygen passage plate used in an airbreathing fuel cell according to an embodiment of the invention.
Figure 2:
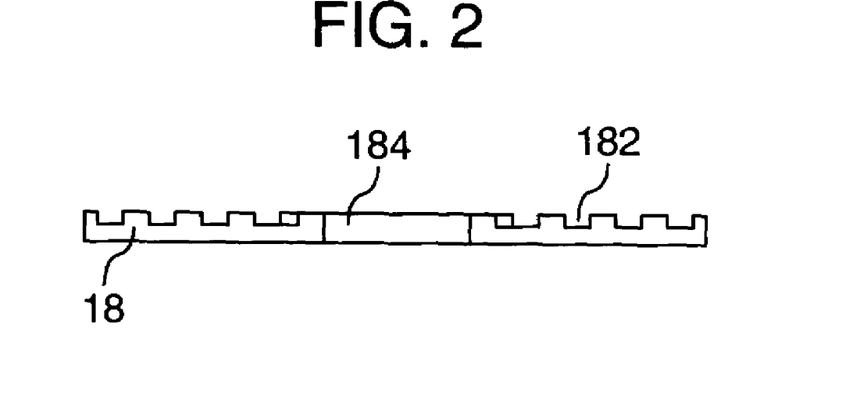
FIG. 2 is a cross sectional view of the oxygen passage plate taken along the line II-II in FIG. 1.

First, referring to FIGS. 1 to 4, FIGS. 3 and 4 are a plan view and a side view showing an outward appearance of an airbreathing fuel cell according to an embodiment of the invention. With the airbreathing fuel cell, a plurality of power generating cells 10, respectively, constituting a cell stack are conventionally configured as shown in FIG. 9. An oxygen passage plate 18 interposed between an oxygen electrode 13b supported by an inner seal 22 and a separator plate 34 is made of the same material and configured as shown in FIGS. 1 and 2.

As shown in FIG. 1 being a plan view and in FIG. 2 being a cross sectional view taken along the line II-II in FIG. 1, the oxygen passage plate 18 is made of a carbon plate to have a general rectangular shape having a thickness of 3.7 mm, a length of 54 mm and a width of 76.2 mm, and formed with a plurality of vertical grooves 182 provided at a pitch of 6.4 mm between hatched portions shown in FIG. 1, and a central hole 184, through which a tie bolt 26 and a fuel distribution manifold 32 provided around the bolt are both extended. The grooves 182 have a width of 3.2 mm and a depth of 1.6 mm as shown in FIG. 2, the grooves being opened outside at both ends thereof and formed around the central hole 184 not to be opened directly to the inner seal 22.

In a state of being assembled into a unit cell 10, the oxygen passage plate 18 is arranged with opened surface sides of the grooves 182 facing toward the separator plate 34, so that an outside air not only passes through pores of the carbon plate but also is supplied midway thereof or directly to a central area thereof through the grooves 182, from which oxygen in the air can be supplied to the oxygen electrode 13b through pores of the carbon plate.

Figure 3:
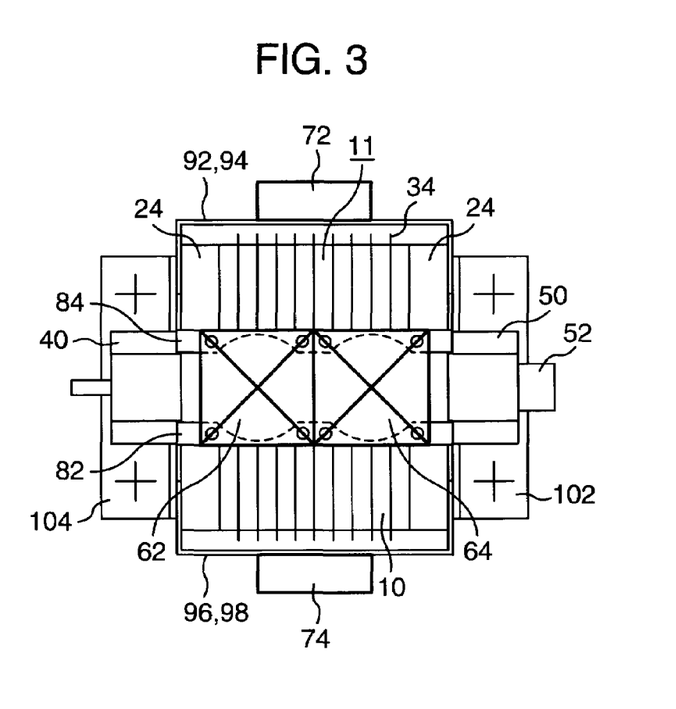
FIG. 3 is a plan view showing an example, in which blowers are used in an airbreathing fuel cell according to an embodiment of the invention.
Figure 4:
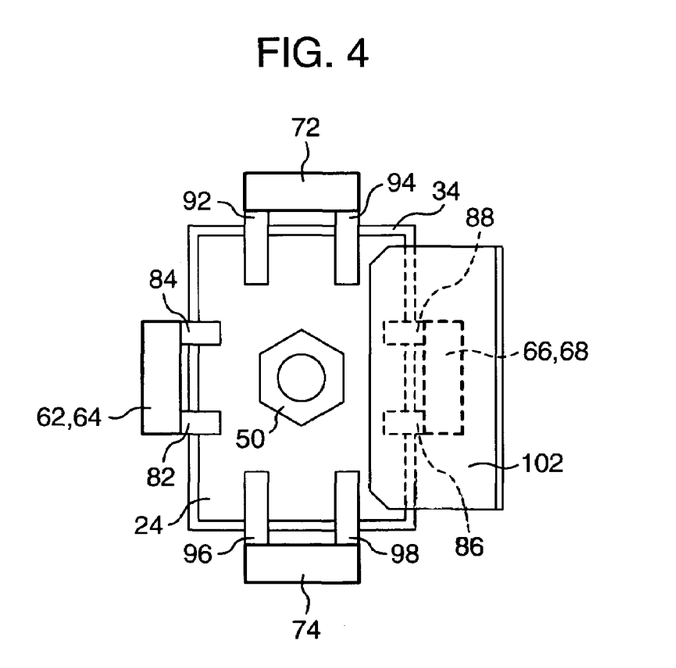
FIG. 4 is a side view showing the airbreathing fuel cell shown in FIG. 3.

A cell stack 11 formed by stacking a plurality of unit cells 10 with such oxygen passage plate 18 assembled thereinto constitute a fuel cell as shown in FIGS. 3 and 4, and can be mounted on an apparatus, installation, or the like according to uses by means of support legs 102, 104 fixed to end plates 24 at both ends of the cell stack 11.

While blowers 62, 64, 66, 68, 72, 74 are provided on an airbreathing fuel cell shown in FIGS. 3 and 4, a conspicuous effect has been confirmed in the case where such blowers are not provided, and so such case will be described.

With the airbreathing fuel cell using the oxygen passage plate 18 structured in the above manner, the oxygen passage plate 18 is not only formed with the grooves 182 to permit an air to directly enter a center portion of the plate but also is formed to be rectangular-shaped to have a large area in contact with an air, thereby increasing an air supplied through pores of the carbon plate to enable adequately performing the power generating reaction with a fuel. Performance curves shown in FIG. 7 definitely reveal results of a comparison made between oxygen passage plates 18 with grooves and without grooves in terms of power generating capacity.

Figure 7:
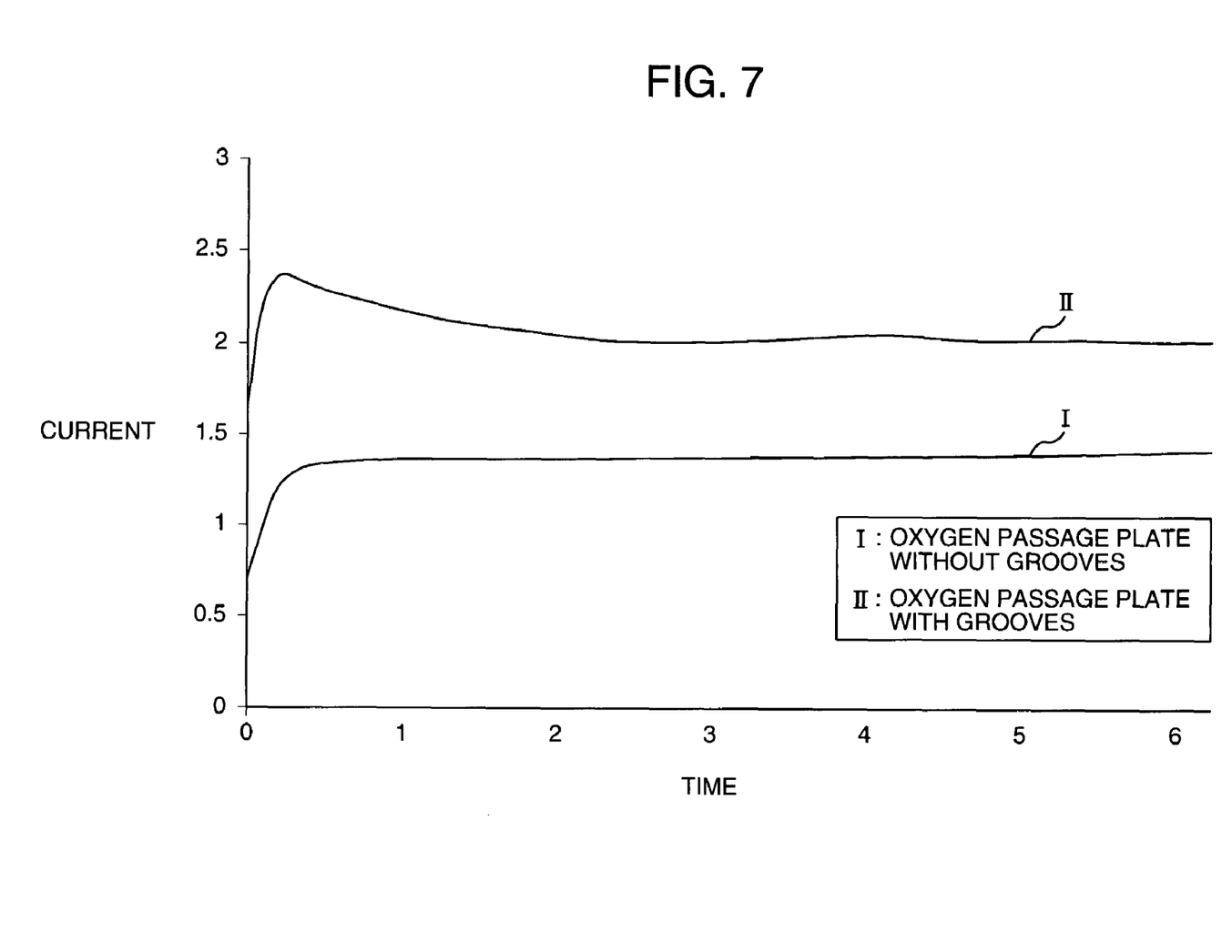
FIG. 7 is a graph showing performance curves of airbreathing fuel cells, in which oxygen passage plates according to the prior art and an embodiment of the invention are used.

That is, a performance curve I in FIG. 7 is for a conventional airbreathing fuel cell, in which grooves are not provided on oxygen passage plates, and a generated electric current rises at 1.5 ampere or less and then is kept as it is. Meanwhile, with the airbreathing fuel cell according to the invention, the grooves 182 are provided on the oxygen passage plates 18 to be opened outside at both ends thereof, and so an air is supplied inside through the grooves 182 to be fed directly to those central portions of the oxygen passage plates 18, to which a fuel is most supplied and in which the power generating reaction with the fuel occurs, so that as shown by a performance curve II in FIG. 7, a generated electric current rises at 1.5 ampere or more from the beginning and can be kept over a long period of time with less decay. In this manner, the oxygen passage plates 18 are made rectangular-shaped and provided with the grooves 182 whereby the power generating performance can be improved as shown in FIG. 7.

Subsequently, an explanation will be given to the case where blowers are provided in the airbreathing fuel cell according to the invention.

Figure 8:
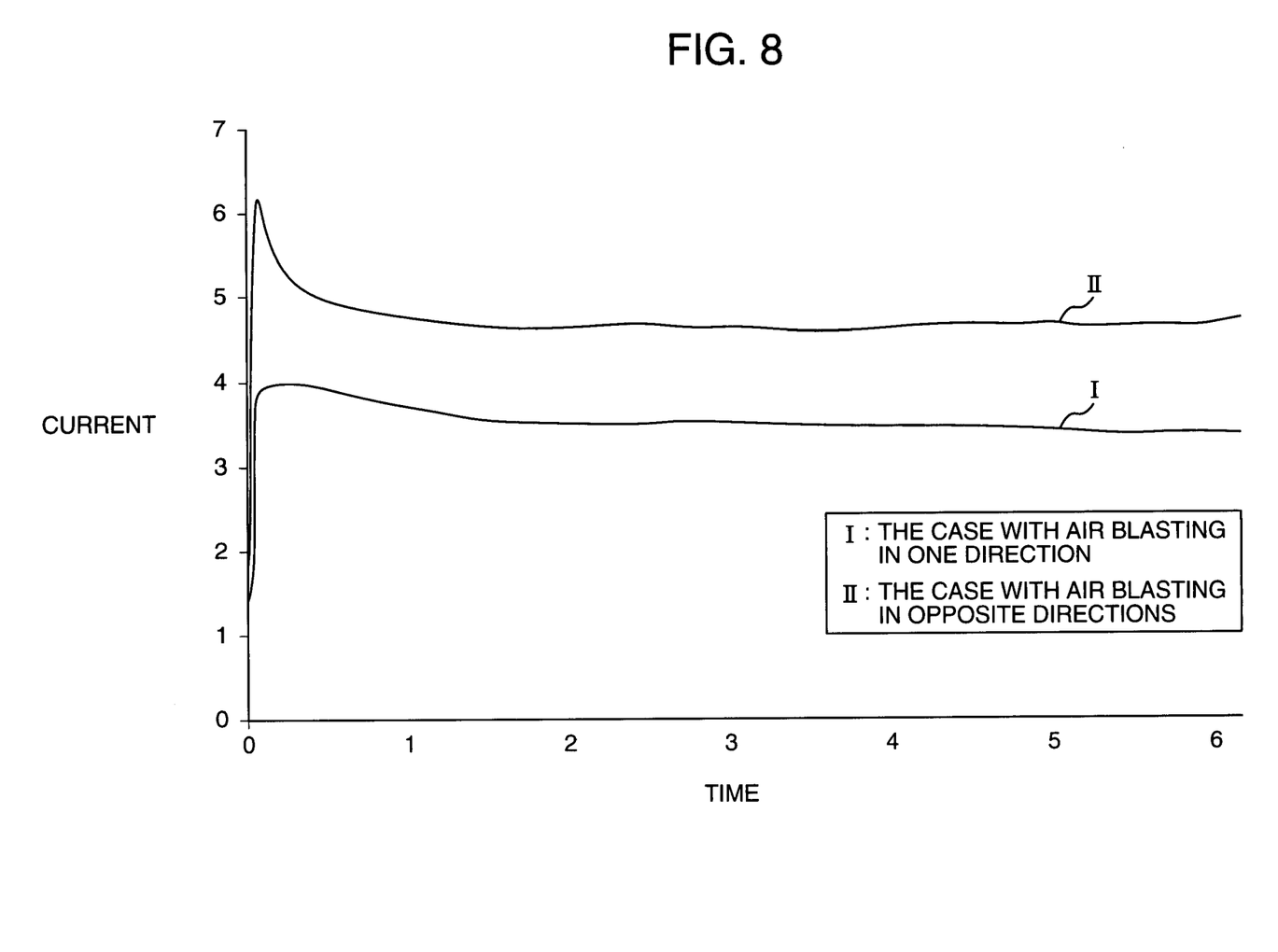
FIG. 8 is a graph showing performance curves of an airbreathing fuel cell according to an embodiment of the invention when an air is blasted in one direction and opposite directions.

First, assuming that the blowers 62, 64 are provided on a side of the cell stack 11 opposite to a side thereof, on which the support legs 102, 104 for mounting the cell stack 11 to an apparatus or the like are provided, the blowers 62, 64 are supported and mounted on two support bases 82, 84 fixed to the end plate 24 so that an air can be blasted toward a side, on which ends of the grooves 182 on the oxygen passage plates 18 are opened. In this case, it is assumed that a fan diameter and a thickness of the blowers 62, 64 are dimensions, as shown in FIGS. 3 and 4, corresponding to those of the cell stack 11 and motors sized to be received in central portions of the fans are used and that other blowers than those specified above are not provided. Accordingly, assuming that the blowers 66, 68, 72, 74 are not provided, an air will be blasted in one direction to the cell stack 11. The power generating performance at that time is indicated by a performance curve I shown in FIG. 8. Since an air is forcibly fed into the grooves 182 of the oxygen passage plates 18 and can be fed directly to central portions of the cells, it is apparent that a more excellent power generating performance than that in the case, shown in FIG. 7, without the blowers is obtained.

Hereupon, as shown in FIGS. 3 and 4, the blowers 66, 68 are provided between the support legs 102, 104 on a side opposite to a side, on which the blowers 62, 64 are provided, that is, a side, on which the fuel cell is mounted to an apparatus or the like, by means of support bases 86, 88 fixed the end plates 24, 24 to be arranged in opposition to the blowers 62, 64. In this case, it is assumed that the blowers 72, 74 have not yet been provided, and an air is supplied into the grooves 182 to face the opened ends of the grooves 182 on the oxygen passage plates 18.

In this state, an air will stay at central portions of the respective grooves 182 in a compressed state, so that the pressurized air is supplied to the oxygen electrodes 13b through pores in the oxygen passage plates 18 and an air having a high oxygen density can perform a power generating reaction with a fuel, which is high in concentration and supplied from the fuel distribution manifold 32. Accordingly, electric power can be generated in a manner indicated by a performance curve II shown in FIG. 8, and so it is possible as seen from a comparison in the figure to generate a generally higher electric current than that indicated by the performance curve I, with which an air is blasted only in one direction to be supplied into the grooves 182, whereby it is possible to perform a more excellent power generation than that with the case where an air is blasted in one direction.

In the airbreathing fuel cell shown in FIGS. 3 and 4, the blower 72 for blasting an air against the cell stack 11 is further provided on support bases 92, 94, ends of which are fixed to the end plates 24, 24, on a side, which is not the opened end side of the grooves 182 of the oxygen passage plates 18 but is in parallel to the grooves 182, and the blower 74 for blasting an air against the cell stack 11 is likewise provided on support bases 96, 98, ends of which are fixed to the end plates 24, 24, on a side opposed to a side, on which the blower 72 is provided.

Such blowers 72, 74 can not only supply an air directly to the oxygen passage plates 18 positively, but also inhibit an air, which has been put in a pressurized state at the central portions of the grooves 182, from flowing outside without being supplied to the oxygen electrodes 13b, so that it is possible to further improve the power generating performance. In this case, while the blowers 72, 74, respectively, are provided one by one, the number of blowers is determined according to a size of the cell stack 11 on the opened end side of the grooves 182 although the size is varied depending upon the number of unit cells 10 in the cell stack 11.

Figure 5:
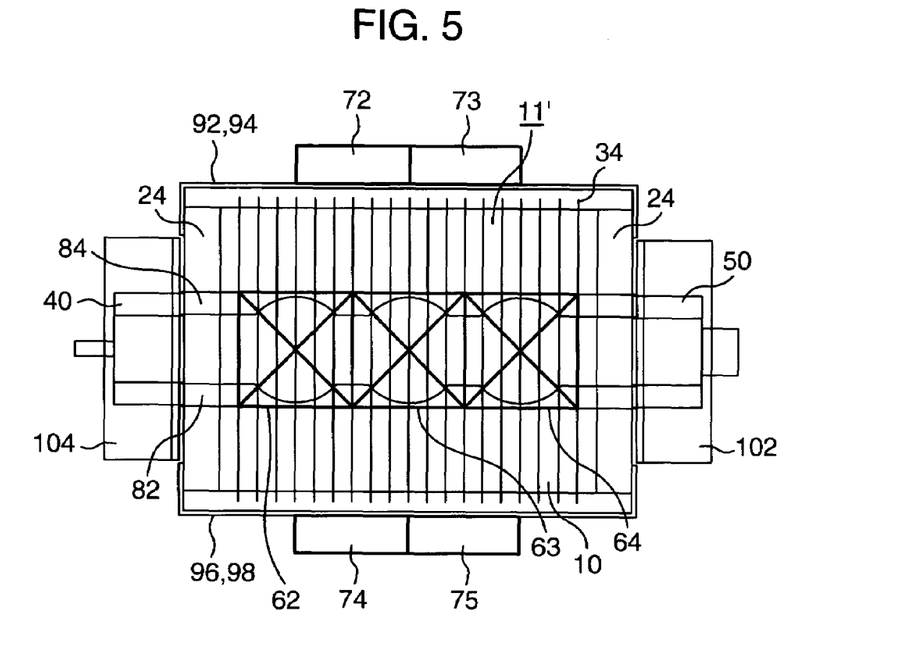
FIG. 5 is a view showing another example of an airbreathing fuel cell according to an embodiment of the invention.
Figure 6:
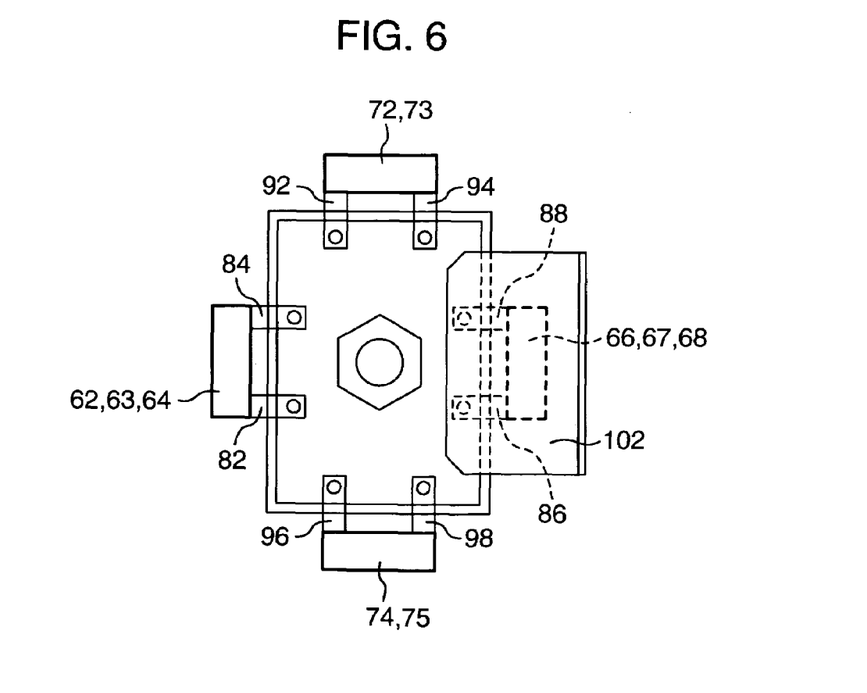
FIG. 6 is a side view showing the airbreathing fuel cell shown in FIG. 5.

An airbreathing fuel cell shown in FIGS. 5 and 6 comprises a cell stack 11', in which the number of unit cells 10 is increased over that shown in FIGS. 3 and 4, and which is enlarged wholly in size. In this case, three blowers 62, 63, 64 are provided on the opened end side of the grooves 182 on the oxygen passage plates 18, and three blowers 66, 67, 68 are also provided on a side opposed to the opened end side. Further, two blowers 72, 73 are provided on a side, to which the grooves 182 of the oxygen passage plates 18 are not opened, and two blowers 74, 75 are provided on a side opposed to the former side to blast an air.

This airbreathing fuel cell can keep a power generating performance of the same level as that shown in FIGS. 3 and 4 and demonstrate a higher power generating capacity than the latter.

In this manner, in the airbreathing fuel cell provided with the oxygen passage plates 18, which are formed to be rectangular-shaped and have the grooves 182 formed substantially in parallel, blowers for forcible supplying of oxygen through the grooves of the oxygen passage plates from outside may be single according to a size of the fuel cell or a required electric power generation and can be selected and arranged so as to obtain an efficient electric power generation.

As described above, the airbreathing fuel cell according to the invention has the following effects due to the abovementioned constitution.

The airbreathing fuel cell comprises a cell stack, the oxygen passage plate comprises a plurality of opened grooves on a surface thereof opposed to the oxygen electrode, and the grooves are opened outside at both ends thereof to permit an air to be supplied to the oxygen passage plate from outside through the grooves, whereby there is produced an excellent effect that it is possible to increase oxygen supplied to the oxygen electrode through pores in the oxygen passage plate itself and to expedite a power generating reaction of oxygen with a fuel at the center of the oxygen passage plate, thus enabling improving the power generating performance.

Also, with the airbreathing fuel cell, blowers for blasting an air into the grooves formed on the oxygen passage plates are provided on the fuel cell, whereby it is possible to positively feed an air into the grooves on the oxygen passage plates, so that supplying of oxygen to the oxygen electrodes can be effected toward the centers of the oxygen passage plates more surely than natural supplying from the grooves, thus enabling improving the power generating performance further.

Also, with the airbreathing fuel cell, the blowers are arranged in opposition to the both opened ends of the grooves on the oxygen passage plates of the cell stack to blast an air so that an air can be supplied to the oxygen passage plates in an opposing manner, whereby an air is forcibly fed into the grooves on the oxygen passage plates from the both ends of the grooves to be compressed in the grooves and an air having been increased in density of oxygen can be fed to the oxygen electrodes through the oxygen passage plates, thus making it possible to supply oxygen adequately conformed to a power generating reaction thereof with a fuel supplied from the centers of the cell stack so as to be able to make the power generating performance higher.

According to a still further embodiment, the blowers for the cell stack are provided at least one by one on sides of the opened ends of the grooves of the oxygen passage plates and on respective sides in parallel to the grooves, and the blowers provided on the opposed sides are provided in opposition to each other respectively to blast an air, whereby not only an air is supplied to the oxygen passage plates through the grooves but also oxygen can be supplied directly to the oxygen passage plates, so that there is produced an excellent effect that it is possible to further expedite a power generating reaction of oxygen and a fuel, thus enabling improving the power generating performance.

In addition, electricity can be supplied to the blowers either directly from the fuel cell body or from other sources than the fuel cell body.

What is claimed is:

1. An airbreathing fuel cell comprising end plates, a unit cell having a central core, said unit cell being disposed between the two end plates, a fuel distribution manifold disposed centrally of the unit cell to supply a fuel thereto, a single tie bolt extending centrally of the fuel distribution manifold and of the unit cell to unite these elements, fixing nuts screwed onto both ends of the tie bolt to integrally clamp the unit cell between the end plates with O-rings or the like therebetween, and a cell stack formed by stacking a plurality of those unit cells, which comprise a solid polymer electrolyte membrane, an oxygen electrode and a fuel electrode, which are provided on both sides of the solid polymer electrolyte membrane to be opposed to each other, a porous oxygen passage plate provided adjacent and toward the oxygen electrode of each unit cell, separator plates provided adjacent and outside the oxygen passage plate and the fuel electrode, wherein the oxygen passage plate comprises a plurality of opened grooves on a surface thereof opposed to the oxygen electrode, each of the grooves having two ends that are opened to an outer periphery of the porous oxygen passage plate and not extending to and therefore being closed to the central bore, such that the grooves of the oxygen passage plate faces away from the oxygen electrode, wherein said fuel cell further comprises blowers for blasting air into the grooves formed on the oxygen passage the grooves, wherein the blowers are arranged in opposition to the both opened ends of the grooves on the oxygen passage plates of the cell stack to blast air into the grooves, whereby air can be supplied centrally of the oxygen passage plates from both ends of the grooves, and further wherein air supplied by the blowers passes through the porous oxygen plate from the grooves to the oxygen electrode of each unit cell.

2. The airbreathing fuel cell according to claim 1, wherein the blowers for the cell stack are provided at least one by one on sides of the both opened ends of the grooves of the oxygen passage plates and on respective sides in parallel to the grooves, and the blowers provided on the opposed sides are provided in opposition to each other respectively to blast an air to the oxygen passage plates.

3. The airbreathing fuel cell according to claim 1 or 2, wherein an outer peripheral surface of the cell stack is rectangular in shape.

4. The airbreathing fuel cell according to claim 1, wherein said porous oxygen passage plate is made of carbon.

5. The airbreathing fuel cell according to claim 1, wherein said blowers are operative to forcibly feed air into said grooves in order to provide compressed air in said grooves.

6. The airbreathing fuel cell according to claim 5, wherein the porous oxygen passage plate has a central portion surrounding the fuel distribution manifold, and at least several of the grooves extend through the central portion so that the blowers are operative to provide compressed air through the several grooves to the central portion.

7. The airbreathing fuel cell according to claim 1, wherein the porous oxygen passage plate has a central portion surrounding the fuel distribution manifold, and at least several of the grooves extend through the central portion so that the blowers are operative to provide compressed air through the several grooves to the central portion.

8. An airbreathing fuel cell comprising end plates, a unit cell having a central core, said unit cell being disposed between the two end plates, a fuel distribution manifold disposed centrally of the unit cell to supply a fuel thereto, a single tie bolt extending centrally of the fuel distribution manifold and of the unit cell to unite these elements, fixing nuts screwed onto both ends of the tie bolt to integrally clamp the unit cell between the end plates with 0-rings or the like therebetween, and a cell stack formed by stacking a plurality of those unit cells which comprise a solid polymer electrolyte membrane, an oxygen electrode and a fuel electrode, which are provided on both sides of the solid polymer electrolyte membrane to be opposed to each other, a porous oxygen passage plate provided adjacent and toward the oxygen electrode, separator plates provided adjacent and outside the oxygen passage plate and the fuel electrode, wherein the oxygen passage plate comprises a plurality of opened grooves on a surface thereof opposed to the oxygen electrode, each of the grooves having two ends that are opened to an outer periphery of the porous oxygen passage plate and not extending to and therefore being closed to the central bore, such that the grooves of the oxygen passage plate faces away from the oxygen electrode, wherein said fuel cell further comprises blowers for blasting an air into the grooves formed on the oxygen passage plates, the blowers being provided on the fuel cell to face the grooves, the blowers being arranged in opposition to the both opened ends of the grooves on the oxygen passage plates of the cell stack to blast air into the grooves, whereby air can be supplied centrally of the oxygen passage plates from both ends of the grooves, wherein the blowers for the cell stack are provided at least one by one on sides of the both opened ends of the grooves of the oxygen passage plates and on respective sides in parallel to the grooves, and the blowers provided on the opposed sides are provided in opposition to each other respectively to blast an air to the oxygen passage plates, wherein an outer peripheral surface of the cell stack is rectangular in shape, and wherein said blowers are operative to forcibly feed air into said grooves in order to provide compressed air in said grooves.

9. The airbreathing fuel cell according to claim 8, wherein the porous oxygen passage plate has a central portion surrounding the fuel distribution manifold, and at least several of the grooves extend through the central portion so that the blowers are operative to provide compressed air through the several grooves to the central portion.

* * * * *

UNITED STATES PATENT AND TRADEMARK OFFICE
CERTIFICATE OF CORRECTION

| | | |
|---|---|---|
| PATENT NO. | : 7,455,926 B2 | Page 1 of 1 |
| APPLICATION NO. | : 10/649869 | |
| DATED | : November 25, 2008 | |
| INVENTOR(S) | : Takehisa Takagi et al. | |

It is certified that error appears in the above-identified patent and that said Letters Patent is hereby corrected as shown below:

Please correct claim 1, at column 7, between lines 33 and 34, insert --plates, the blowers being provided on the fuel cell to face--.

Signed and Sealed this

Thirty-first Day of March, 2009

JOHN DOLL
*Acting Director of the United States Patent and Trademark Office*